(12) United States Patent
Buescher et al.

(10) Patent No.: US 8,490,925 B2
(45) Date of Patent: Jul. 23, 2013

(54) NON-PLANAR WING TIP DEVICE FOR WINGS OF AIRCRAFT, AND WING COMPRISING SUCH A WING TIP DEVICE

(75) Inventors: Alexander Buescher, Bremen (DE); Michael Karwin, Weyhe (DE); Frank Theurich, Hude (DE)

(73) Assignee: Airbus Operations GmbH, Hamburg (DE)

( * ) Notice: Subject to any disclaimer, the term of this patent is extended or adjusted under 35 U.S.C. 154(b) by 264 days.

(21) Appl. No.: 12/989,903

(22) PCT Filed: Apr. 30, 2010

(86) PCT No.: PCT/EP2010/002663
§ 371 (c)(1),
(2), (4) Date: Nov. 4, 2010

(87) PCT Pub. No.: WO2010/124877
PCT Pub. Date: Nov. 4, 2010

(65) Prior Publication Data
US 2011/0192937 A1    Aug. 11, 2011

Related U.S. Application Data

(60) Provisional application No. 61/174,083, filed on Apr. 30, 2009.

(30) Foreign Application Priority Data

Apr. 30, 2009   (DE) .......................... 10 2009 019 542

(51) Int. Cl.
*B64C 23/06* (2006.01)
(52) U.S. Cl.
USPC ........... 244/199.4; 244/45 R; 244/47; 244/87; 244/91

(58) Field of Classification Search
USPC ............................ 244/199.4, 45 R, 47, 87, 91
See application file for complete search history.

(56) References Cited

U.S. PATENT DOCUMENTS 4,240,597 A * 12/1980 Ellis et al. ................... 244/35 R
5,348,253 A *  9/1994 Gratzer ......................... 244/91
(Continued)

FOREIGN PATENT DOCUMENTS

CN   101263052 A   9/2008
DE   10117721 A1   10/2002
(Continued)

OTHER PUBLICATIONS

Chinese Office Action for corresponding Chinese Patent Application No. 201080001469.7, dated Oct. 10, 2012.

*Primary Examiner* — Tien Dinh
*Assistant Examiner* — Assres H Woldemaryam
(74) *Attorney, Agent, or Firm* — Matthew B. Dernier, Esq.; Gibson & Dernier LLP (57) ABSTRACT

A wing tip device for a wing includes a root and a tip, and the following determinant characteristics: the local dihedral of the wing tip device continuously increases or decreases from the root to the tip; the local sweep of the trailing edge continuously increases along its progression from the root to the tip of the wing tip device; where the local sweep of the leading edge continuously increases in the progression of the leading edge from the root to a first intermediate point; continuously decreases from the first intermediate point to a second intermediate point; and continuously increases from the second intermediate point at least to a region before of the tip of the wing tip device; as well as a wing comprising a wing tip device.

10 Claims, 3 Drawing Sheets

U.S. PATENT DOCUMENTS

| | | | | |
|---|---|---|---|---|
| 5,407,153 A * | 4/1995 | Kirk et al. | | 244/199.4 |
| 6,484,968 B2 * | 11/2002 | Felker | | 244/91 |
| 6,722,615 B2 * | 4/2004 | Heller et al. | | 244/199.4 |
| 6,827,314 B2 * | 12/2004 | Barriety | | 244/201 |
| 7,275,722 B2 * | 10/2007 | Irving et al. | | 244/201 |
| D597,472 S * | 8/2009 | Cazals | | D12/319 |
| 7,624,951 B1 * | 12/2009 | Kraft et al. | | 244/199.4 |
| D607,806 S * | 1/2010 | Saint-Jalmes et al. | | D12/319 |
| 7,644,892 B1 * | 1/2010 | Alford et al. | | 244/199.4 |
| 7,744,038 B2 * | 6/2010 | Sankrithi et al. | | 244/199.4 |
| 7,900,876 B2 * | 3/2011 | Eberhardt | | 244/199.4 |
| 7,900,877 B1 * | 3/2011 | Guida | | 244/199.4 |
| 7,971,832 B2 * | 7/2011 | Hackett et al. | | 244/199.4 |
| 7,988,100 B2 * | 8/2011 | Mann | | 244/199.4 |
| 7,997,875 B2 * | 8/2011 | Nanukuttan et al. | | 416/237 |
| D649,506 S * | 11/2011 | Morelli | | D12/319 |
| 8,056,852 B1 * | 11/2011 | Dizdarevic et al. | | 244/36 |
| 8,128,035 B2 * | 3/2012 | Malachowski et al. | | 244/199.4 |
| 8,177,162 B2 * | 5/2012 | Karkow et al. | | 244/105 |
| 8,241,002 B2 * | 8/2012 | Wobben | | 416/228 |
| 8,262,017 B2 * | 9/2012 | Fraser | | 244/45 R |
| 2002/0162917 A1 * | 11/2002 | Heller et al. | | 244/199 |
| 2006/0249630 A1 * | 11/2006 | McCarthy | | 244/199.4 |
| 2007/0252031 A1 * | 11/2007 | Hackett et al. | | 244/4 R |
| 2008/0223991 A1 * | 9/2008 | Mann | | 244/199.4 |
| 2008/0308683 A1 * | 12/2008 | Sankrithi et al. | | 244/199.4 |
| 2009/0014592 A1 * | 1/2009 | Zha | | 244/199.4 |
| 2009/0302167 A1 * | 12/2009 | Desroche | | 244/199.4 |
| 2010/0019094 A1 * | 1/2010 | Theurich et al. | | 244/199.4 |
| 2010/0148010 A1 * | 6/2010 | Hunter | | 244/199 |
| 2010/0155541 A1 * | 6/2010 | Garang | | 244/199.4 |
| 2010/0181432 A1 * | 7/2010 | Gratzer | | 244/199.4 |
| 2011/0272530 A1 | 11/2011 | Mann | | |

FOREIGN PATENT DOCUMENTS

| | | |
|---|---|---|
| RU | 2086467 C1 | 8/1997 |
| WO | 2006030213 A1 | 3/2006 |
| WO | 2007031732 A1 | 3/2007 |

* cited by examiner

NON-PLANAR WING TIP DEVICE FOR WINGS OF AIRCRAFT, AND WING COMPRISING SUCH A WING TIP DEVICE

CROSS REFERENCE TO RELATED APPLICATIONS

This application claims priority to PCT Application No. PCT/EP2010/002663, filed Apr. 30, 2010; which claims priority to German Patent Application No. DE 10 2009 019 542.4, filed Apr. 30, 2009, and claims the benefit to U.S. Provisional Patent Application No. 61/174,083, filed Apr. 30, 2009, the entire disclosures of which applications are hereby incorporated by reference.

BACKGROUND

The invention relates to a non-planar wing tip device for the wing of an aircraft, and to a wing comprising such a wing tip device.

From the state of the art non-planar wing tip devices are known which differ not only in their geometric shapes but also in their design sizes.

From DE 101 17 721 A1a wingtip extension for a wing is known, comprising an upper surface and a lower surface as well as a leading edge and a trailing edge, with the geometries of said wingtip extension being such that between a joint region for attachment to a wing and the tip of the wingtip extension a continuous increase in the local dihedral, a continuous increase in the sweep of both the leading edge and of the trailing edge, and a continuous decrease in the chord length of the wingtip extension result, and such that the wingtip extension joins the wing in the joint region in an essentially continuous manner.

The literature provides a multitude of different wing tip devices or winglets which are predominantly provided for reducing the aerodynamic drag, and thus for improving aerodynamic performance. The definition of wing tip devices can take place either within the scope of the concept of a new overall aircraft or within the scope of retrofitting such a wing tip device to an already existing aircraft. In the latter case the existing wing geometry is replaced by another wing geometry. In both cases in the design of the wing tip device the resulting gain in aerodynamic performance needs to be balanced against the usually increased structural load, which is often in a simplified manner evaluated by means of the integral wing root bending moment, and all the resulting consequences relating to the weight of the aircraft. The evaluation of various tip devices can return different results based on the given design scenario and on the boundary conditions.

From the general state of the art a so-called wing tip fence (WTF) is also known, which comprises two components of similar size and which extends upwards and downwards almost perpendicularly to the wing. In order to optimise the flow quality at the wing, wing tip devices with continuously smooth transitions of the sweep and the dihedral between the outer part of the main wing on which the wing tip device is arranged and the wing tip device have been implemented.

SUMMARY OF THE INVENTION

It is the object of the invention to provide a wing tip device and a wing comprising such a wing tip device, by means of which, when compared to known wing tip devices, an improvement in the aerodynamic performance of the wing on which the wing tip device is arranged, and thus also an improvement in the aircraft can be achieved in a larger number of aircraft that differ in their size and/or performance spectrum. It is also the object of the invention to provide a wing tip device and a wing comprising such a wing tip device, by means of which the retrofitting of aircraft whose size and/or performance spectrum differs is possible with the provided wing tip device for improving the aerodynamic characteristics of the wing and of the aircraft, which improvement requires no modifications or only slight modifications of the wing.

This objective is met by the characteristics of one or more embodiments disclosed and described herein. Further embodiments are also disclosed and described herein.

The wing tip device according to the invention can, in particular, be implemented as a separate part that is attached to the outer part of a main wing and that in this way without necessary changes or with only comparatively minor necessary changes, and thus relatively economical changes in the wing structure, achieves optimal aerodynamic efficiency, for example during cruise.

With the characteristics of the wing tip device according to the invention a performance improvement of the wing to which the wing tip device has been attached is achieved, as is an performance improvement in the overall aircraft with the wing. The design of the wing tip device according to the invention makes it possible to integrate a navigation light together with a glassing for covering said navigation light.

Furthermore, embodiments of the wing tip device according to the invention make it possible when said wing tip device has been attached as part of a retrofit to keep low the additional structural load that is effective on the wing, and with corresponding matching of the shape according to the invention to the situation of the respective individual case to reduce said structural load so that it is negligible. Consequently, the wing tip device according to the invention is particularly suitable for retrofitting the wing of an existing aircraft either entirely or with only very minor modification of the wing.

In wing tip devices known from the state of the art, the above is either not possible, or possible only to a very limited extent, because these tip devices, with the exception of the wingtip fence, primarily aim to achieve significantly greater drag reductions, which usually result in increases in the wing root bending moment of a corresponding magnitude. If, provided this is possible at all, the wing tip devices known from the state of the art were designed according to the above-mentioned measures, for example if the load is neutral or the increase in the structural load effective on the wing were designed to a lesser value, then in the known wing tip devices this would result in designs, for example relating to the geometric height, which return insufficient performance improvements of the wing, so that they would not be economical.

In contrast to this, with the wing tip device according to the invention the effects according to the invention of aerodynamic performance improvement of the wing are achieved also in relation to attached said tip device to a wing as part of a retrofit with a relatively compact design or short effective span of the wing tip device and/or a low aerodynamic load caused by the wing tip device.

According to the invention, a wing tip device for attachment on a wing is provided, which wing tip device comprises a root and a tip and the following determinant characteristics:
  the local dihedral of the wing tip device continuously increases or decreases from the root to the tip;
  the local sweep of the trailing edge continuously increases along its progression from the root to the tip of the wing tip device;

the local sweep of the leading edge continuously increases in the progression of the leading edge from the root to a first intermediate point; continuously decreases from the first intermediate point to a second intermediate point; and continuously increases from the second intermediate point at least to a region before (inboard of) the tip of the wing tip device when the progression of the leading edge is viewed from the root to the tip.

It can be provided for the local sweep of the leading edge to continuously increase from the second intermediate point to the tip of the wing tip device. As an alternative to this it can be provided for the local sweep of the leading edge to continuously increase from the second intermediate point to a sub-region of the wing tip device, which sub-region extends before (inboard of) the tip and along a maximum of the outermost 8% of the length of the wing tip device, which length extends in longitudinal direction between the root and the tip.

An example of the invention provides for the increase or decrease in the local dihedral of the wing tip device to be designed in such a way that the angular difference between the local span direction on the root and the local span direction on the tip ranges between 30 degrees and 90 degrees.

A further example of the invention provides for the distance between the root and the outermost point of the tip, when viewed in the longitudinal direction that extends from the root to the tip of the wing tip device, is between 20% and 80% of the local profile chord length at the root, wherein the distance between the root and the outermost point of the tip (E2) is defined in the local wing tip device thickness direction of the local coordinate system of the wing tip device.

As an alternative or in addition, an example embodiment of the invention can provide for the length, which extends along the longitudinal direction of the wing tip device, of the first section, which is situated between the root and the first turning point, to measure between 15% and 50% of the length of the wing tip device, which length extends along the longitudinal direction.

As an alternative or in addition, an example embodiment of the invention can provide for the length, which extends along the longitudinal direction, of the second section, which is situated between the first turning point and the second turning point, to measure between 5% and 30% of the length of the wing tip device.

As an alternative or in addition, an example embodiment of the invention can provide for the length, which extends along the longitudinal direction of the wing tip device, of the third section, which is situated between the second turning point and the tip, to measure between 15% and 70% of the length of the wing tip device.

An example embodiment of the invention can provide for the leading edge of the third section to match with the trailing edge at the tip.

BRIEF DESCRIPTION OF THE DRAWINGS

According to a further aspect of the invention, a wing with a wing tip device according to the invention is provided. Below, example embodiments of the invention are described with reference to the enclosed figures which show the following.

DETAILED DESCRIPTION OF THE INVENTION

Figure 1:
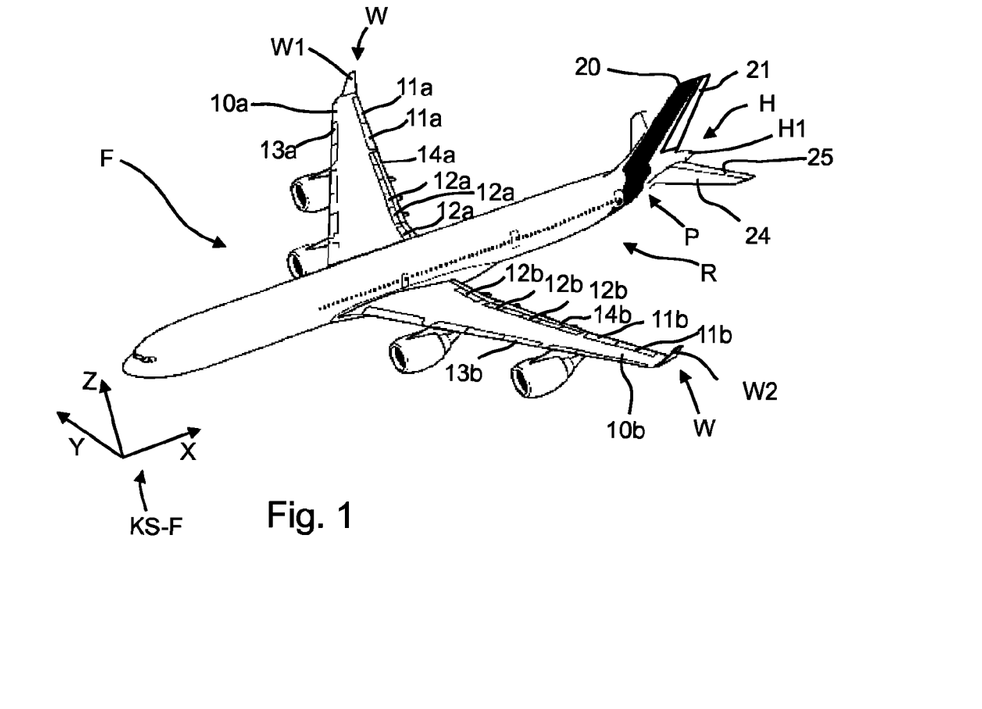
FIG. 1 illustrates a diagrammatic perspective view of an aircraft with an example embodiment of the wing tip device according to the invention.
Figure 2:
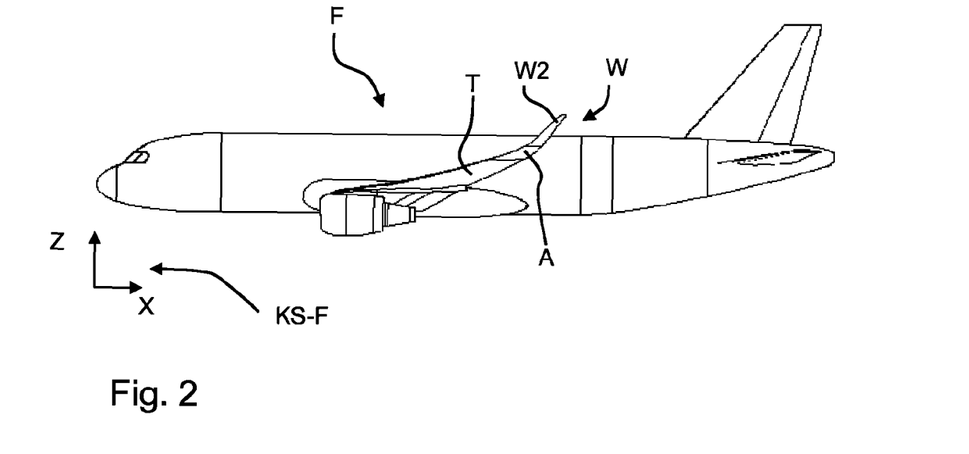
FIG. 2 illustrates a diagrammatic lateral view of an aircraft with a further example embodiment of the wing tip device according to the invention.
Figure 3:
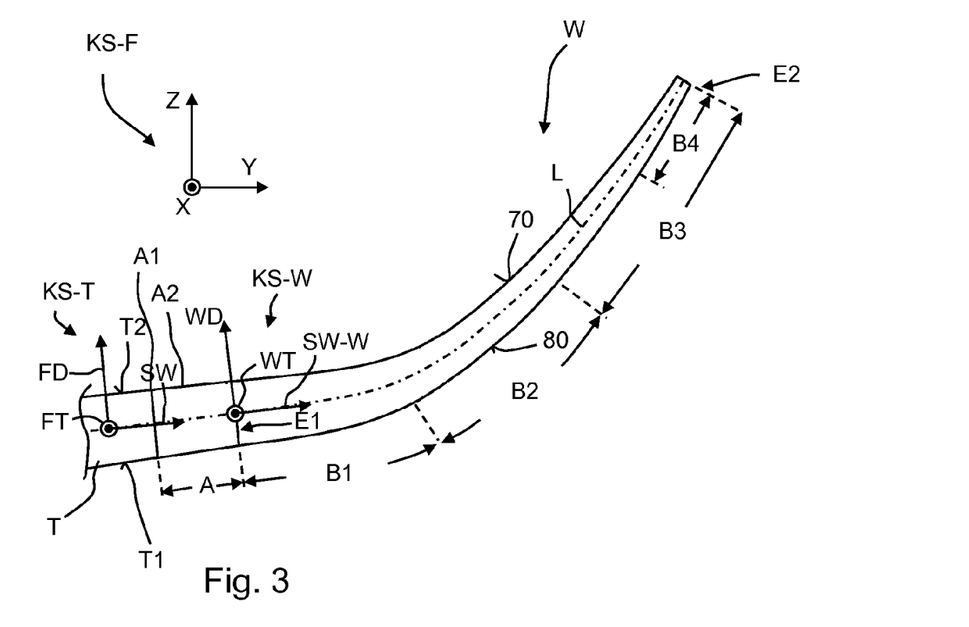
FIG. 3 illustrates a diagrammatic rear view of an example embodiment of the wing tip device according to the invention.

FIGS. 1 and 2 show an example embodiment of an aircraft F with two wings 10*a*, 10*b*, on each of which a wing tip device W1, W2 according to the invention can be arranged. FIGS. 1 and 2 also show the aircraft coordinate system KS-F. Each wing 10*a*, 10*b* comprises at least one aileron 11*a* or 11*b*. Optionally, each wing 10*a*, 10*b* can comprise a multitude of spoilers 12*a* or 12*b*, slats 13*a*, 13*b* and/or trailing-edge flaps 14*a*, 14*b*. In FIG. 1 only some of the spoilers 12*a* or 12*b*, slats 13*a*, 13*b* and/or trailing-edge flaps 14*a*, 14*b* have a reference character. FIG. 1 also shows a coordinate system relating to the aircraft F, with a longitudinal axis X of the aircraft, a transverse axis Y of the aircraft, and a vertical axis Z of the aircraft. Furthermore, the aircraft F comprises a vertical tail unit 20 with at least one rudder 21. Optionally the aircraft F can also comprise an elevator tailplane 24 that comprises at least one elevator 25. The elevator tailplane 24 can also be designed as a T-tail or a cruciform tail.

The aircraft F according to the invention can also be of a shape that differs from that of the aircraft F shown in FIGS. 1 and 2. For example, the aircraft according to the invention can also be a high-wing aircraft or a blended wing body. Furthermore, the aircraft can also be an aircraft that comprises canards instead of an elevator tailplane.

FIGS. 3, 4, 5 and 6 show an example embodiment of the wing tip device W according to the invention for a right-hand wing when viewed in the direction of flight or against the longitudinal axis X of the aircraft. In FIGS. 1 and 2 the right-hand wing tip device is designated W1, while in FIGS. 3, 4, 5 and 6 it is designated W. In FIGS. 3, 4, 5 and 6 the aircraft coordinate system KS-F and the coordinate system KS-T of the wing T, on which the wing tip device W is arranged, are also shown.

The coordinate system KS-T of the wing T is a local coordinate system that comprises a span direction SW, a wing chord direction FT and a wing thickness direction FD. According to a definition according to the invention, the local coordinate system KS-T for the wing T is oriented in such a way that the local wing chord direction FT extends parallel to the longitudinal axis X of the aircraft coordinate system KS-F. Orientation of the axes and the location of the origin of the local coordinate system KS-T of the wing T can, in particular, furthermore be defined on the basis of the respectively resulting smallest cross-sectional area, which results at each point of the wing T, of the wing T, wherein the origin of the local coordinate system KS-T is the area centre of gravity that results in relation to the respective cross-sectional area and that is situated in said cross-sectional area, and the local wing thickness direction FD and the local wing chord direction FT are situated in the respectively smallest cross-sectional area.

According to an alternative definition according to the invention, the local coordinate system KS-T for the wing T is oriented in such a way that the wing chord direction FT of the coordinate system KS-T of the wing T extends in the X-direction or longitudinal direction of the aircraft coordinate system KS-F and that the wing thickness direction FD of the coordinate system KS-T of the wing T extends in the Z-direction of the aircraft coordinate system KS-F or of the direction of the vertical axis Z of the aircraft F.

In relation to the span direction SW of the wing T on which the wing tip device is arranged, the wing tip device W comprises a root E1 to form a wing tip device connection, and a tip E2, which forms the wingtip, and extends the wing T in whose span direction SW starting from the outermost part of the wing T to which the wing tip device W has been attached. The wing tip device W comprises a trailing edge 50, a leading edge 60, an upper surface 70 and a lower surface 80, which in each case extend between the root E1 and the tip E2.

The wing tip device W can be attached directly to the wing T. In this arrangement, adjoining areas or lines of the wing T and of the wing tip device W can comprise an edge or a kink.

Furthermore, the wing tip device W can be attached to the wing T by way of an interface or a transition region A. In this arrangement the upper surface A1 of the transition region A on the one hand joins the upper surface T1 of the wing T, and on the other hand joins the upper surface 70 of the wing tip device W, while the lower surface A2 of the transition region A on the one hand joins the lower surface T2 of the wing T, and on the other hand joins the lower surface 80 of the wing tip device W. In this case, adjacent areas or lines, at an interface A adjacent to the wing T and to the wing tip device W or within the interface A, can form an edge or a kink.

In the example embodiments, shown in FIGS. 3, 4, 5 and 6, of a wing T with a wing tip device W according to the invention, an interface or transition region A is provided between the wing T and the wing tip device W. In these example embodiments the transition region A or the transition between the wing T and the wing tip device W and the trailing edge 50, the leading edge 60, the upper surface 70 and/or the lower surface 80 are designed fulfilling tangent continuity, i.e. without a kink; in other words the wing has a progression with a mathematically-differentiable curve shape in which, as stated above, the tangents, which at the transition point result from opposite directions, of the surfaces of the wing T or of the wing tip device W meet each other without angular discontinuity.

In particular, the transition from the surface of the wing T to the transition region A and/or from the surface of the transition region A to the wing tip device W can be shaped with curvature continuity, i.e. twice mathematically differentiable.

According to an example embodiment, the interface or the transition region A and/or the transition between the wing T and the wing tip device W and, in particular, the trailing edge 50, the leading edge 60, the upper surface 70 and/or the lower surface 80 comprises an edge or a corner so that these positions do not form part of a kink-free and curved section, because at these transition points the respective tangents of the wing T and of the wing tip device W meet each other with angular discontinuity, with regard to the tangents that arise from directions that extend opposite one another.

Generally speaking, for a description of the transition region A, insofar as the latter is provided in an embodiment of the wing according to the invention, a definition, according to the invention, of the local wing coordinate system KS-T also needs to be applied.

According to a further example embodiment of the invention, it can be provided for the wing T not to comprise a transition region A, with the transition from the surface of the wing T to the wing tip device W to fulfil tangent continuity (in other words differentiable at least once) or with curvature continuity.

In the wing tip device W, W1, W2 according to the invention it is provided for the local dihedral of the wing tip device W, W1, W2 to continuously increase or decrease from the root E1 to the tip E2, in other words in longitudinal direction L of the wing tip device W. In the case of the dihedral increasing in longitudinal direction L of the wing tip device W, the wing tip device W, W1, W2 or its tip E2 is directed upwards, while in the case of the dihedral decreasing in longitudinal direction L of the wing tip device W, the wing tip device W, W1, W2 or its tip E2 is directed downwards.

In this context the term "upwards", starting from the wing T, refers to the direction that points away from the upper surface T1 of the wing T, in other words the positive Z-direction of the aircraft coordinate system KS-F or the positive wing thickness direction of the wing coordinate system KS-T.

According to an example embodiment of the wing tip device W, the upper surface and/or the lower surface of the wing tip device W can in all directions along the respective side be designed to provide tangent continuity or curvature continuity. In an example embodiment the upper surface and/or the lower surface of the wing tip device W can also comprise a kink at one or several positions so that the upper surface and/or the lower surface are/is at least continuous in shape.

The local dihedral can refer to a reference line of the wing tip device W, which reference line extends along the longitudinal direction L. In this arrangement the local dihedral is the angle between the tangent extending along the reference line at the respective point at which the local dihedral is determined and a fixed line. The reference line can, in particular, be defined by the connecting line of the area centres of gravity of the cross-sectional areas of the wing tip device W, which are situated in the X-Z-plane of the aircraft coordinate system KS-F. The fixed line can, in particular, be a line that extends parallel to the Y-axis of the aircraft coordinate system KS-F.

According to the invention, the longitudinal direction L can, in particular, be identical to the above-mentioned reference line. In the description of the shape of the wing tip device W according to the invention, reference is made to a local coordinate system KS-W relating to the wing tip device W, which coordinate system is locally formed on the points of the progression of the longitudinal direction L of the wing tip device W. The axes of the local coordinate system KS-W relating to the wing tip device W are: the local span direction SW-W, the local wing tip device thickness direction WD, and the local wing tip device chord direction WT, which extends parallel to the longitudinal axis X of the aircraft coordinate system KS-F. The orientation of these axes and the origin of the local coordinate system KS-W of the wing tip device W can, in particular, continue to be defined on the basis of the smallest cross-sectional area of the wing tip device W, which area results in each case at each point of the wing tip device W, wherein the origin of the local coordinate system KS-W is provided by the area centre of gravity in relation to the respective cross-sectional area and situated in said cross-sectional area, and the local wing tip device thickness direction WD and the local wing tip device chord direction WT are situated in the respective smallest cross-sectional area.

In this arrangement the longitudinal direction L can be the connecting line of the area centres of gravity with the smallest cross-sectional areas in which in each case the local wing tip device thickness direction WD as well as the local wing tip device chord direction WT or the local wing-thickness direction FD and the local wing chord direction FT are situated.

According to one aspect of the invention it can, in particular, be provided for the wing tip device chord that extends in the local wing tip device chord direction WT, and for the wing tip device thickness that extends in the local wing tip device thickness direction WD to continuously decrease along the wing tip device longitudinal direction L.

According to the invention, the term "continuous" decrease or "continuous" increase of a determinant refers to the determinant, in other words in the above-mentioned example the wing tip device thickness, monotonically decreasing or increasing along a respective relevant reference line. In this arrangement the progression of the increase or decrease of the determinant can also comprise a kink.

According to a further determinant characteristic of the wing tip device W according to the invention, the local sweep of the trailing edge 50, also referred to as the trailing edge sweep, continuously increases along its progression from the root E1 to the tip E2 or at least to a space or region before (inboard of) the tip E2. Consequently, in top view of the aircraft F against the Z-direction, as a result of the increase in the sweep along the longitudinal direction L of the wing tip device the trailing edge 50 curves to such an extent that the angle between the direction of the trailing edge 50 and the aircraft longitudinal direction X continuously and monotonically decreases. In this arrangement the progression of the trailing edge 50 is, in particular, differentiable from a mathematical point of view so that the trailing edge 50 is increasingly curved backwards when viewed along the longitudinal direction L of the wing tip device. According to an example embodiment of the wing tip device W the progression of the trailing edge 50 can be shaped so as to provide tangent continuity or curvature continuity. In an example embodiment the trailing edge 50 of the wing tip device W can also comprise a kink at one or several positions so that the trailing edge 50 is at least continuous.

As far as the design of the wing tip device W is concerned, the invention further provides for the local sweep of the leading edge 60, the leading edge sweep, to continuously increase in the progression of the leading edge 61 from the root E1 to a first intermediate point 61a, to decrease in the progression of the leading edge 62 from the first intermediate point 61a to a second intermediate point 62a, and to continuously increase in the progression of the leading edge 63 from the second intermediate point 62a at least to a region before (inboard of) the tip E2 of the wing tip device W, W1, W2 so that the first intermediate point 61a and the second intermediate point 62a are each turning points of the progression of the leading edge 60.

According to an example embodiment of the wing tip device W, the progression of the leading edge 60 can be shaped with tangent continuity or with curvature continuity. In a further example embodiment the leading edge 60 of the wing tip device W can also comprise a kink in one or several positions, so that the leading edge 60 is at least continuous in shape.

Figure 4:
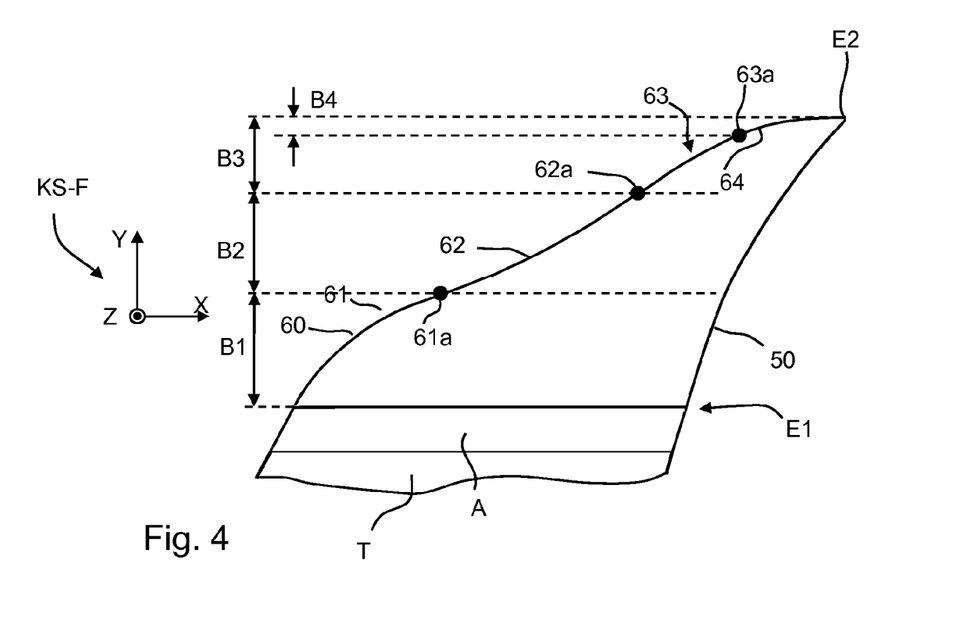
FIG. 4 illustrates a diagrammatic top view of a first example embodiment of the wing tip device according to the invention.

In an example embodiment of the wing tip device W according to the invention, which is shown in FIG. 4, the leading edge 63 in an outer sub-section B4 of the third section B3 is shaped in such a way that the leading edge 60 and the trailing edge 50 in an outer end point converge as the tip E2. To this effect it can, in particular, be provided for the local sweep of the leading edge 60 in the progression of the leading edge 64 along the longitudinal direction L from the starting point 63a of the sub-section 64 to the tip E2 relative to the local sweep angles in the progression of the section B3 before the sub-section or sub-region B4 to increase in a significantly more pronounced manner, which results in a greater reduction in the profile chord length. Such a partial section B4 can, in particular, extend along a longitudinal section which when viewed in longitudinal direction L comprises a length of 3% to 8% of the overall length of the wing tip device W.

According to a further example embodiment of the invention, the region in which, viewed in longitudinal direction L, the sweep of the leading edge 60 increases extends only to the sub-region B4, which at the maximum extends over 8% of the length, which progresses in longitudinal direction L, of the wing tip device W; W1, W2. For example, in the sub-region B4 the leading edge can progress in a manner that differs from that provided for according to the invention, generally to the sub-region B4 in the third section B3. For example, in the sub-region B4 the sweep of the leading edge 60 can increase again. In another example embodiment the sweep remains constant in the sub-region B4. However, in any case, when viewed in longitudinal direction L the sweep of the leading edge 60 increases at least to the sub-region B4 in front of the tip E2 of the wing tip device W; W1, W2, wherein the region before of the tip E2 at the maximum extends along the outermost 8% of the length of the wing tip device W; W1, W2, which length extends along the longitudinal direction L. According to another example embodiment of the invention it can, however, also be provided for the region B4 to not exist at all, as is shown, for example, in FIG. 5.

By means of the intermediate points 61a, 62a the wing tip device W can be divided into three spanwise regions B1, B2, B3, wherein the boundary areas of each region can be defined in such a manner that they extend along the X-Z-plane of the aircraft coordinate system KS-F (FIG. 4) or along the local wing tip device thickness direction WD and the local wing tip device chord direction WT. The first region B1 is situated between the root E1 and the first turning point 61a; the second region B2 is situated between the first turning point 61a and the second turning point 62a; and the third region B3 is situated between the second turning point 62a and the tip E2.

The length, which extends along the longitudinal direction L of the wing tip device W; W1, W2, of the first section, which is situated between the root E1 and the first turning point 61a, is between 15% and 50% of the length which extends along the longitudinal direction L of the wing tip device W; W1, W2. Furthermore, the length, which extends along the longitudinal direction L, of the second section B2, which is situated between the first turning point 61a and the second turning point 62a, is between 5% and 30% of the length of the wing tip device W; W1, W2. The length, which extends along the longitudinal direction L of the wing tip device W; W1, W2, of the third section B3, which is situated between the second turning point 62a and the tip E2, is between 15% and 70% of the length of the wing tip device W; W1, W2.

In the first section B1 the sweep of the leading edge 60 increases very considerably up to a defined reversal point. In conjunction with the significantly less pronounced increase in the trailing edge sweep, in this region of the tip device a strong reduction in the profile chord length thus results. In the subsequent progression in the second region B2 the leading edge angle is slightly reduced again until finally from a further reversal point it continuously increases again up to the outer section of the tip device.

In particular the characteristics, provided for according to the invention, of the progression of the leading edge 60 and in this arrangement, in particular, a change in the sweep in the third region B3 provide variation options in the design of the wing tip device W overall, as a result of which the aerodynamic effects that in this context can be achieved in relation to the wing T and the aircraft F can be influenced. By changing or adapting the sweep of the leading edge 60, in particular, adaptation of the progression of the profile chord length along the longitudinal direction L can be undertaken for advantageous fulfillment of design boundary conditions and aerodynamic requirements. By changing the leading edge sweep according to the solution according to the invention the profile chord length of the wing tip device W can be varied over the span or along the longitudinal direction L thereof, and can be set on the basis of concept boundary conditions and requirements. Furthermore, by changing or adapting the sweep of the leading edge 60, in particular, adaptation of the span of the wing tip device W can be achieved, and in conjunction with the progression of the profile chord length along the longitudinal direction L adaptation of the resulting surface of the wing tip device W can also be achieved. By providing two turning points 61a and 62a in the progression of the leading edge 60 it becomes possible to set the flow components on the wing tip device W in the local wing tip device span direction SW-W and of the local wing tip device chord direction WT for various flow conditions, taking into account design boundary conditions. Design boundary conditions can, in particular, include the complete area of the wing tip device W, the total weight of the wing tip device W, the lift coefficient of the wing tip device W, and/or the local surface loading in regions of the wing tip device W.

In this arrangement it can, for example, be provided for the increase in the sweep of the leading edge 60 in the third region B3 to be less when compared to the increase in the sweep of the leading edge 60 in the first region B1. In this example an increase in the span of the wing tip device W and a reduction of the aerodynamic drag of the wing T can be achieved.

Figure 5:
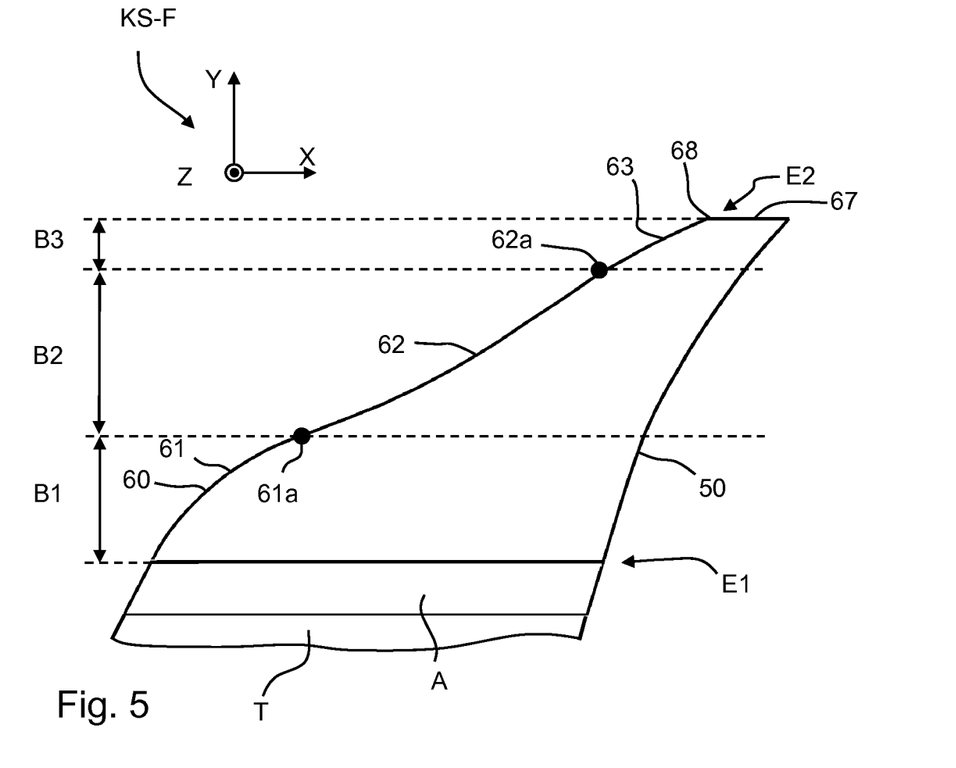
FIG. 5 illustrates a diagrammatic top view of a second example embodiment of the wing tip device according to the invention, with the outermost region of said wing tip device being designed in an alternative manner when compared to the wing tip device shown in FIG. 4.
Figure 6:
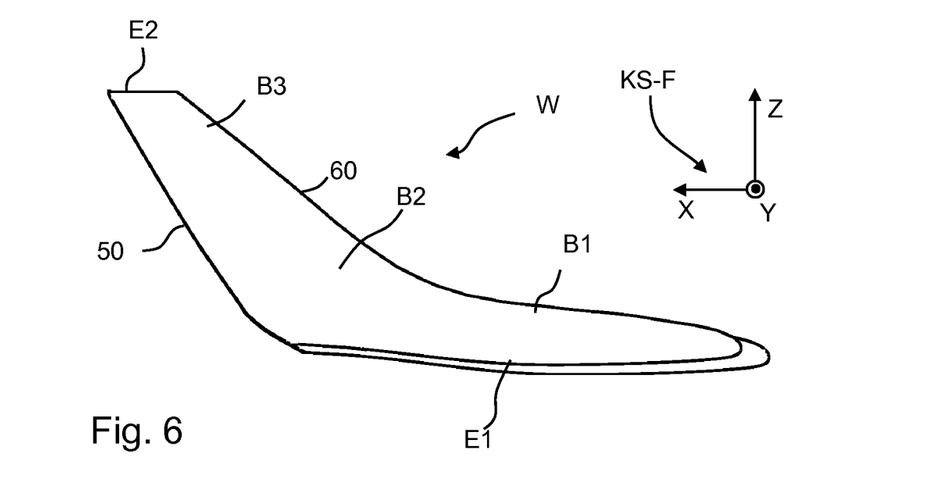
FIG. 6 illustrates a diagrammatic lateral view of the wing tip device geometry.

An example embodiment of the invention, which is, for example, shown in FIG. 5, provides for the decrease in the wing tip device chord length to be from the largest value or 100% value on the root E1 to the tip of the region B3 to 5% to 25% of this value. In this arrangement the tip E2 can form an edge that can extend so as to have either a straight or a curved shape. It can also be provided for the edge 67 to join the leading edge 60 of the third section B3 by means of a kink 68. The edge 67 can, in particular, extend parallel to the longitudinal axis X of the aircraft. Furthermore, the design according to the invention of the wing tip device W results in considerable constriction of the cross-sectional area resulting locally along the longitudinal direction L in the inner part of the wing tip device that spanwise is situated on the first region B1. As a result of this, the surface of the geometry of the wing tip device W according to the invention, when compared to other known designs of wing tip devices, is considerably smaller with the same effective span (see FIGS. 4 and 5).

Due to this determining feature, a situation arises in which by means of the wing tip device W according to the invention, when compared to other known designs of wing tip devices, lower maximum design heights are achieved. The invention can provide for the distance between the root and the outermost point of the tip, when viewed in the longitudinal direction L that extends from the root E1 to the tip E2 of the wing tip device W; W1, W2, is between 20% and 80% of the local profile chord length WT at the root E1, wherein the distance between the root E1 and the outermost point of the tip E2 is defined in the local wing tip device thickness direction WD of the local coordinate system KS-W of the wing tip device W.

The geometric shape of the wing tip device W provided according to the invention results in an tip device that aerodynamically is only weakly loaded. Apart from the usual design parameters of geometric twist and camber, this is achieved to a significant degree as a result of the very considerable reduction in the local profile chord lengths in the inner spanwise region B1. As a result of the subsequent two changes in the progression of the local sweep of the leading edge 60, the span extension of the wing tip device W according to the invention is significantly increased when compared to a known tip device with a continuously increasing leading edge sweep. It is thus possible to derive aerodynamic advantages relating to induced drag and profile drag both from the span effect and from the reduction in the wetted area. At the same time, when compared to known solutions, the geometric form, provided according to the invention, of the wing tip device W while providing equal aerodynamic efficiency causes reduced structural load on the wing F.

If on the other hand the structural advantage is balanced by additional geometric height and/or span extension on the wing tip device W according to the invention, due to the consequently resulting aerodynamic load distribution and the wetted area, a gain in the overall drag is achieved when compared to a known wing tip device.

The wing tip device W according to the invention can, in particular, be used for retrofitting or refitting already existing aircraft in relation to which a gain in aerodynamic performance is to be achieved without structural changes, or with only marginal structural changes, to the wing T.

The invention claimed is:

1. A wing tip device for a wing, comprising a root and a tip, where a local dihedral of the wing tip device continuously increases or decreases from the root to the tip, wherein:
    a local sweep of a trailing edge continuously increases along its progression from the root to the tip of the wing tip device; and
    a local sweep of a leading edge continuously increases in the progression of the leading edge from the root to a first intermediate point; continuously decreases from the first intermediate point to a second intermediate point; and continuously increases from the second intermediate point at least to a region before of the tip of the wing tip device.

2. The wing tip device according to claim 1, wherein the local sweep of the leading edge continuously increases from the second intermediate point to the tip of the wing tip device.

3. The wing tip device according to claim 1, wherein the local sweep of the leading edge continuously increases from the second intermediate point to a sub-region of the wing tip device, which sub-region B4 extends before the tip and along a maximum of the outermost 8% of the length of the wing tip device, which length extends in longitudinal direction between the root and the tip.

4. The wing tip device according to claim 1, wherein the increase or decrease in the local dihedral of the wing tip device is designed in such a way that an angular difference between the local span direction on the root and the local span direction on the tip ranges between 30 degrees and 90 degrees.

5. The wing tip device according to claim 1, wherein a distance between the root and an outermost point of the tip, when viewed in a longitudinal direction that extends from the root to the tip of the wing tip device, is between 20% and 80% of a local profile chord length at the root, wherein the distance between the root and the outermost point of the tip is defined in the local wing tip device thickness direction of a local coordinate system of the wing tip device.

6. The wing tip device according to claim 1, wherein a length, which extends along a longitudinal direction of the wing tip device, of a first section, which is situated between the root and the first turning point, measures between 15% and 50% of the length of the wing tip device, which length extends along the longitudinal direction.

7. The wing tip device according to claim 1, wherein a length, which extends along a longitudinal direction, of a second section, which is situated between the first turning point and the second turning point, measures between 5% and 30% of the length of the wing tip device.

8. The wing tip device according to claim 1, wherein a length, which extends along a longitudinal direction of the wing tip device, of a third section, which is situated between the second turning point and the tip, measures between 15% and 70% of the length of the wing tip device.

9. The wing tip device according to claim 3, wherein a leading edge of the third section converges with a trailing edge at the outer end.

10. A wing comprising a wing tip device according to claim 1.

* * * * *